United States Patent [19]

Matlack et al.

[11] Patent Number: 5,175,238

[45] Date of Patent: Dec. 29, 1992

[54] POLYAMIDE HAVING IMPROVED GAS BARRIER PROPERTIES FROM ADIPIC ACID, ISOPHTHALIC ACID AND M-XYLYLENE DIAMINE

[75] Inventors: John D. Matlack, Lilburn; James G. Villanueva; Bruce A. Newman, both of Snellville, all of Ga.; Lawrence D. Lillwitz, Glen Ellyn, Ill.; Melvin L. Luetkens, Jr.; Gregory E. Schmidt, both of Batavia, Ill.

[73] Assignee: Amoco Corporation, Chicago, Ill.

[21] Appl. No.: 575,070

[22] Filed: Aug. 30, 1990

Related U.S. Application Data

[63] Continuation of Ser. No. 383,185, Jul. 21, 1989, abandoned.

[51] Int. Cl.⁵ .................................... C08G 69/26
[52] U.S. Cl. ............................ 528/339; 528/338; 528/340; 528/347
[58] Field of Search .............. 528/339, 340, 338, 347

[56] References Cited

U.S. PATENT DOCUMENTS

| | | | |
|---|---|---|---|
| 2,715,620 | 8/1955 | Carlston et al. | 260/78 |
| 2,742,496 | 4/1956 | Lum et al. | 260/501 |
| 2,766,222 | 10/1956 | Lum et al. | 260/78 |
| 3,379,695 | 4/1968 | Wolfes et al. | 260/78 |
| 3,475,387 | 10/1969 | Carter et al. | 260/78 |
| 4,018,746 | 4/1977 | Brinkmann et al. | 528/347 |
| 4,133,802 | 1/1979 | Hachiboshi et al. | 528/502 |
| 4,250,297 | 2/1981 | Nielinger et al. | 528/340 |
| 4,398,642 | 8/1983 | Okudaira et al. | 215/1 C |
| 4,501,781 | 2/1985 | Kushida et al. | 428/35 |
| 4,535,901 | 8/1985 | Okudaira et al. | 215/1 C |
| 4,603,166 | 7/1986 | Poppe et al. | 524/606 |
| 4,603,193 | 7/1986 | Richardson et al. | 528/342 |
| 4,702,859 | 10/1987 | Shimizu et al. | 252/511 |
| 4,728,549 | 3/1988 | Shimizu et al. | 428/35 |
| 4,800,129 | 1/1989 | Deak | 428/474.4 |
| 4,831,108 | 5/1989 | Richardson et al. | 528/335 |
| 4,908,272 | 3/1990 | Harada et al. | 428/412 |
| 4,983,719 | 1/1991 | Fox et al. | 528/339 |

FOREIGN PATENT DOCUMENTS

| | | |
|---|---|---|
| 0212339 | 4/1983 | European Pat. Off. |
| 0186154 | 12/1985 | European Pat. Off. |
| 0288972 | 4/1988 | European Pat. Off. |
| 2145260 | 8/1972 | Fed. Rep. of Germany |
| 2344334 | 6/1975 | Fed. Rep. of Germany |
| 60-232952 | 11/1985 | Japan |
| 60-238355 | 11/1985 | Japan |
| 60-240452 | 11/1985 | Japan |

OTHER PUBLICATIONS

Bulletin by Toyobo Co., Ltd. titled "Toyobo Nylon MXD6".

*Primary Examiner*—Harold D. Anderson
*Attorney, Agent, or Firm*—Robert G. Ladd; Stephen L. Hensley; Frank J. Sroka

[57] ABSTRACT

A polyamide composition comprising the following recurring units:

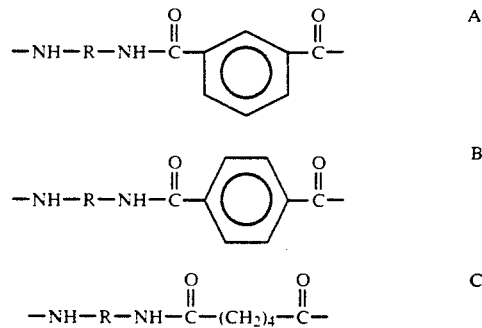

in proportions such that the mole ratio of the dicarboxylic acid moieties in the A, B and C units is about 49.5–0.5/0–20/0.5–49.5 and wherein R is a divalent radical comprising

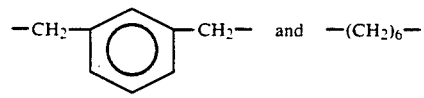

in a mole ratio of about 0.5–50/49.5–0 and preferably having a glass transition temperature of 90° C. or greater and an oxygen transmission rate of about 2.0 cc-mil/100 in²-day-atm or less.

12 Claims, No Drawings

POLYAMIDE HAVING IMPROVED GAS BARRIER PROPERTIES FROM ADIPIC ACID, ISOPHTHALIC ACID AND M-XYLYLENE DIAMINE

This is a continuation of application Ser. No. 383,185, filed Jul. 21, 1989, now abandoned.

FIELD OF THE INVENTION

The present invention relates to polyamide compositions having excellent gas barrier properties which improve with increasing relative humidity, high transparency and resistance to whitening and hazing and to fabricated articles comprising such compositions. More specifically, it relates to such polyamide compositions comprising recurring hexamethylene and metaxylylene isophthalamide, adipamide and, optionally, terephthalamide units in proportions having a high degree of transparency and resistance to whitening and glass transition temperatures, Tgs, of at least about 90° C. and an oxygen transmission rate of about 2.0 cc-mil/100 in$^2$-day-atm or less.

BACKGROUND OF THE INVENTION

Various amorphous polyamide compositions and utility thereof in a wide range of applications are well known. Such compositions are generally characterized by a high degree of transparency and lack of a sharply defined melting point. Applications for such compositions include films, sheets, laminates and molded articles. A disadvantage of some of these compositions is their relatively poor thermal properties which limits their utility to relatively low temperature applications.

An example of such a composition, disclosed in U.S. Pat. Nos. 2,715,620 and 2,742,496, is a polyamide of isophthalic acid and hexamethylenediamine. As reported in U.S. Pat. No. 4,250,297, however, such compositions have poor dimensional stability at elevated temperatures. That patent proposed to overcome such difficulties by replacing part of the hexamethylenediamine with an isomer mixture of 2,2,4- and 2,4,4-trimethylhexamethylenediamine.

Amorphous polyamides based on terephthalic acid and isophthalic acid or their derivatives and hexamethylenediamine also are known as reported in U.S. Pat. No. 3,379,695 and U.S. Pat. No. 3,475,387. While such compositions exhibit improved heat deflection temperatures relative to the isophthalic acid and hexamethylenediamine polyamides, transparency of articles prepared from the compositions suffers and crystallization of the polymer can occur during use of the articles at elevated temperatures if the mole ratio of isophthalic acid to terephthalic acid is too low.

U.S. Pat. No. 2,766,222 discloses transparent compositions prepared from isophthalic acid or isophthalic acid/terephthalic acid mixtures and metaxylylenediamine and that such compositions are suitable for production of molded articles of high transparency, good heat and chemical resistance and excellent tensile and impact strengths. Softening points of 150°-170° C. for such compositions are reported in the examples. It also is disclosed that transparency of the compositions suffers if greater than about 40 mol % isophthalic acid is replaced with terephthalic acid.

U.S. Pat. No. 4,018,746 also is directed to transparent metaxylylenediamine-based compositions, disclosing polyamides prepared from a mixture of straight chain aliphatic diamines of 4-20 carbon atoms and metaxylylenediamine or a mixture of metaxylylenediamine and paraxylylenediamine and a mixture of a saturated aliphatic dicarboxylic acid of 5-20 carbon atoms and at least one aromatic dicarboxylic acid selected from terephthalic acid and isophthalic acid. Aliphatic diamine content of the diamine mixture is said to range from 5-90 mole % and aliphatic acid content of the acid mixture is said to range from 10-90 mol %. The polyamides are said to be useful in preparation of transparent articles such as sheets, plates, tubes, wire coverings and injection molded technical parts.

Utility of metaxylylenediamine group-containing polyamides in molded containers and vessels is disclosed in U.S. Pat. No. 4,398,642 directed to a multi-ply vessel comprising an inner layer of polyester resin, a middle layer composed of a metaxylylene group-containing polyamide resin and an outer layer composed of a synthetic resin having impermeability to moisture. The metaxylylene group-containing polyamide middle layer is said to provide gas barrier properties. However, the glass transition temperature of the metaxylylene polyamide is about 80° C., such that vessels prepared therefrom are susceptible to deformation at elevated temperatures including those to which the vessels may be exposed during hot filling processes.

U.S. Pat. No. 4,535,901 discloses a multi-ply vessel comprising an odd number of layers with the innermost and outermost layers of polyester resin, and at least one middle layer composed of a metaxylylene group-containing polyamide. The middle layer is covered completely by both inner and outer layers to provide good water resistance, high chemical resistance and high hygienic qualities.

It also is known that water absorption lowers the glass transition temperature, Tg, and the crystallization temperature of non-oriented metaxylylene polyamide resin. This effect is observed as a haze in the nonoriented neck portions of multilayer containers having such resins as the inner gas barrier layer. U.S. Pat. No. 4,501,781 discloses that a gap may form between the inner surface layer and the intermediate layer resulting in a decrease of transparency of the container. The patent discloses the use of a mixture of polyethylene terephthalate resin and a xylylene group-containing polyamide resin.

Japanese Patent Applications 60-232,952, 60-238,355 and 60-240,452 disclose copolymers of metaxylylenediamine with adipic acid and isophtalic acid containing 30 to 100% isophthalic acid and polyester laminated moldings consisting of a copolymer layer and a polyethylene terephthalate layer.

U.S. Pat. No. 4,728,549 discloses a biaxially oriented multilayered container comprising a wall portion consisting of at least two metaxylylene group-containing polyamide resin layers and one more polyethylene terephthalate layer than the number of metaxylylene group-containing polyamide layers with the terminal portion of the mouth opening being polyethylene terephthalate.

U.S. Pat. No. 4,800,129 discloses thermoformed multilayer structures comprising at least a first and a second layer, the first layer comprising a blend of amorphous polyamides having a Tg greater than about 120° C. and one or more semicrystalline aliphatic polyamide and the second layer comprising a structural thermoplastic resin.

European Patent Application 0 212 339 discloses a method for making a hollow two-layer blow-molded bottle having one layer formed of a biaxially oriented polyethylene terephthalate resin and a second layer formed of a mixture of polyethylene terephthalate resin and 5 to 50 percent by weight of a xylene derivative polyamide resin.

European Patent Application 0 186 154 discloses a nine-layer parison, process for its production and a multilayer container produced from the parison wherein the nine-layer structure is composed of two outside layers and one central layer of polyethylene terephthalate (PET) and two interlayers of a metaxylylenediamine (MXDA) nylon with four adhesive layers of a thermoplastic adhesive resin being positioned between the PET layers and the MXDA nylon layers. This process requires adhesive layers between the PET and MXDA nylon layers.

European Patent Application 0 288 972 discloses a multilayered structure having at least one layer of a copolyamide composed of 55 to 70 mol % of an aliphatic dicarboxylic acid component and 45 to 30 mol % of an aromatic dicarboxylic acid component and a diamine component consisting substantially of metaxylylenediamine. The copolyamides of this patent have relatively high levels of an aliphatic dicarboxylic acid such as adipic acid and use metaxylylenediamine as the diamine component.

U.S. Pat. No. 4,133,802 discloses a biaxially drawn film of a polyamide containing a metaxylylene group which has excellent mechanical and physical properties including a high gas barrier property.

While these patents and publications disclose various amorphous polyamides and properties thereof, there remains a need for polyamide compositions having a desirable balance of properties, including ease of melt processing, sufficiently high glass transition temperature for use of articles fabricated from the compositions at elevated temperatures, good transparency and resistance to hazing and good oxygen barrier properties.

An object of the present invention is to provide improved polyamide compositions.

A further object is to provide a polyamide composition which exhibits improved gas barrier properties, resistance to whitening upon exposure to moisture and ease of processing.

A still further object of the present invention is to provide metaxylylenediamine-containing polyamides for use as the polyamide compositions and for use as a blend component for miscible polyamide blends that make up the improved polyamide compositions.

These and other objects and advantages of the present invention will be apparent to those skilled in the art from the following description.

We have now found that the objects of this invention can be attained by providing polyamide compositions comprising recurring hexamethylene and metaxylylene isophthalamide, adipamide and, optionally, terephthalamide units in proportions such that a high degree of transparency and resistance to whitening and glass transition temperatures, Tgs, of at least about 90° C. are obtained. Advantageously, such polyamide compositions can be prepared directly by copolymerization of suitable starting materials or by blending polyamide homopolymers or copolymers to achieve the desired component proportions. Such polyamide compositions exhibit single Tgs. The compositions are well suited for use in the manufacture of a wide range of fabricated articles, such as films, sheets, laminates and molded articles, including monolayer and multilayer containers for barrier packaging. The compositions have thermal properties comparable with those of polyethylene terephthalate polymer and thus are well suited for manufacture of multiwall containers having excellent oxygen barrier and haze resistance properties. The oxygen barrier properties approach those of poly(metaxylyleneadipamide) and the compositions retain excellent clarity even when exposed to high humidity conditions.

SUMMARY OF THE INVENTION

Briefly, the polyamide compositions according to this invention comprise the following recurring units:

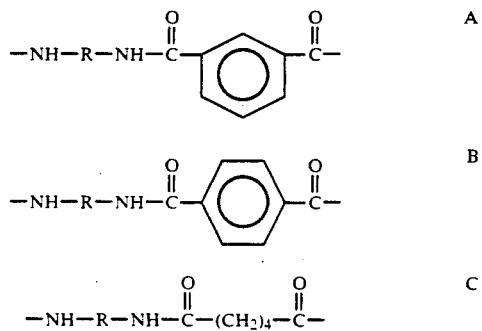

in proportions such that the mole ratio of the dicarboxylic acid moieties in the A, B and C units is about 49.5-0.5/0-20/0.5-49.5 and wherein R is a divalent radical comprising

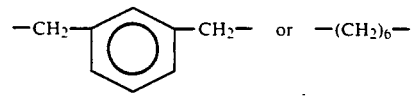

provided that said radicals

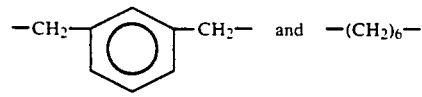

are present in the A, B and C units in a mole ratio of about 0.5-50/49.5-0 and which, preferably, have a glass transition temperature of 90° C. or greater and an oxygen transmission rate of about 2.0 cc-mil/100 in$^2$-day-atm or less.

DESCRIPTION OF THE INVENTION

In accordance with the present invention, it has been found that polyamide compositions comprising the following recurring units:

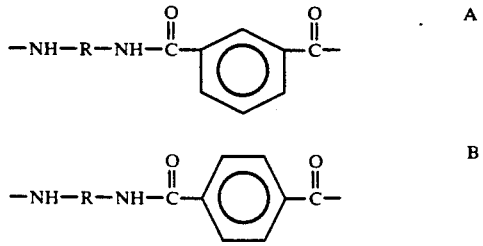

-continued

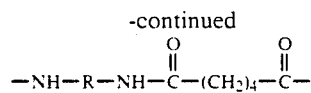

in proportions such that the mole ratio of the dicarboxylic acid moieties in the A, B and C units is about 49.5-0.5/0-20/0.5-49.5 and wherein R is a divalent radical comprising

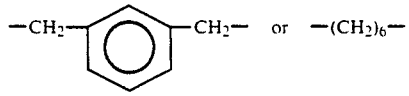

provided that said radicals

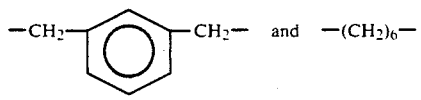

are present in the A, B and C units in a mole ratio of about 0.5-50/49.5-0 and have a desirable combination of glass transition temperatures and oxygen barrier properties. Polyamide compositions having a molar ratio of 37.5-5/0-15/12.5-37.5/37.5-12.5/12.5-37.5 for isophthalic acid, terephthalic acid, adipic acid, metaxylylenediamine and hexamethylenediamine have a glass transition temperature of 90° C. or greater and an oxygen transmission rate of about 2.0 cc-mil/100 in$^2$-day-atm or less.

The polyamide compositions of this invention are amorphous polymeric materials which exhibit improved performance of molded parts at higher temperatures by having Tgs of 90° C. or greater, improved oxygen barrier properties by having oxygen transmission rates of about 2.0 cc-mil/100 in$^2$-day-atm or less as determined on unoriented film prepared from the polyamide compositions and improved resistance to whitening or hazing in fabricated articles such as films, laminates and molded articles prepared from the polyamide compositions.

The desired polyamide compositions have oxygen transmission rates of about 2.0 cc-mil/100 in$^2$-day-atm or less as determined on unoriented films prepared from the polyamide compositions of this invention by a Modern Control Company, Ox-Tran 1000 instrument at a temperature of 23° C., 100% oxygen and 0% relative humidity. An oxygen transmission rate of 2.0 cc-mil/100 in$^2$-day-atm is intermediate between a typical value of about 0.6 cc-mil/100 in$^2$-day-atm for a metaxylylenediamine/adipic acid polyamide and a typical value of 4.2 cc-mil/100 in$^2$-day-atm for PET. The lower value of the oxygen transmission rate of the invented polyamide compositions approaches the 0.6 cc-mil/100 in$^2$-day-atm value for a metaxylylenediamine/adipic acid polyamide.

The polyamide compositions of the present invention have a greater resistance to whitening or hazing in fabricated articles prepared from these compositions when the articles are exposed to ambient or elevated temperatures at high relative humidity conditions. The relatively slow crystallization rates of the polyamide compositions makes these materials excellent polyamide compositions for ease of melt processing, good oxygen barrier and excellent retention of transparency when used for production of fabricated articles.

The polyamide compositions according to this invention can be prepared by copolymerizing isophthalic acid (IA), optionally terephthalic acid (TA), adipic acid (AA), metaxylylenediamine (MXDA) and hexamethylenediamine (HMDA) in a molar ratio of about 49.5-0.5/0-20/0.5-49.5/0.5-50/49.5-0. The polyamide compositions according to the instant invention can also be a miscible blend of suitable amounts and types of homopolymers and/or copolymers of isophthalic acid and/or adipic acid and/or, optionally, terephthalic acid with metaxylylenediamine and, optionally, hexamethylenediamine in proportions such that the molar ratio range of about 49.5-0.5/0-20/0.5-49.5/0.5-50/49.5-0 for the A, B and C units and metaxylylene and hexamethylene radicals is satisfied.

The copolymers of the polyamide compositions of this invention can be prepared by copolymerizing the appropriate acids and diamines in suitable proportions by any suitable means. The copolymerization can be a batchwise, semicontinuous or continuous process with commonly assigned U.S. Pat. No. 4,603,166 as one such method for preparing the copolymers. The reactants for preparing the copolymers preferably are isophthalic acid, optionally terephthalic acid, adipic acid, metaxylylenediamine and hexamethylenediamine in the mole ratio given above with a preferred mole ratio of about 37.5-5/0-15/12.5-37.5/37.5-12.5/12.5-37.5. Most preferred is a mole ratio of about 30-5/0-15/15-30/30-20/20-30 for IA/TA/AA/MXDA/HMDA. Copolymers having the preferred mole ratio have Tgs of about 90° C. to about 110° C. and oxygen transmission rates of about 2.0 cc-mil/100 in$^2$-day-atm or less. Minor amounts of other aromatic and aliphatic dicarboxylic acids can be included in the polyamide compositions as well as diamines such as trimethylhexamethylenediamine.

It has been found that a miscible blend of an amorphous polyphthalamide comprising a copolymer of isophthalic acid and, optionally, terephthalic acid and hexamethylenediamine in a molar ratio of 50-27.5/0-22.5/50 and a metaxylylenediamine-containing polyamide resin comprising adipic acid and, optionally, isophthalic acid, and metaxylylenediamine in a molar ratio of about 50-35/0-15/50 can also be used for the polyamide compositions of the instant invention. A preferred miscible blend is prepared by melt blending about 99 to about 1 weight percent of an amorphous polyphthalamide having IA, TA and HMDA moieties in a molar ratio of about 50-27.5/0-22.5/50 and about 1 to about 99 weight percent of a metaxylylenediamine-containing polyamide (hereinafter also denoted as MXDA resin) having AA, IA and MXDA moieties in a molar ratio of about 50-35/0-15/50.

A MXDA resin that can be used as a component of the polymer blend of the present invention is described in U.S. Pat. No. 4,398,642 which is herein incorporated by reference. This resin is a 50/50 molar ratio of adipic acid and metaxylylenediamine. Other examples of MXDA resins are a copolymer of the monomers composing the above homopolymer and other copolymerizable monomers such as aliphatic diamines (e.g., hexamethylenediamine and trimethylhexamethylenediamine), and aromatic dicarboxylic acids (e.g., terephthalic acid and isophthalic acid). The preferred MXDA resin used in the miscible blend method of preparing the polyamide compositions is a copolymer of adipic acid and, optionally, isophthalic acid, and metaxylylenediamine in a molar ratio of about 50-35/0-15/50. More preferred, is a copolymer of AA/IA/MXDA having a molar ratio of about 45-35/5-15/50. The MXDA resins can be prepared by any suitable means for copolymerizing polyamides containing AA, IA and MXDA moieties.

The amorphous polyphthalamide useful in the miscible blends are those which are substantially lacking in crystallinity as shown by the lack of an endotherm crystalline melting peak in a Differential Scanning Calorimeter test as determined according to ASTM D3417 and whose Tgs are greater than about 120° C. as measured according to ASTM D3418. These amorphous polyphthalamides are prepared from at least one aliphatic diamine, isophthalic acid and, optionally, terephthalic acid. Particularly preferred polyphthalamide components for the polyamide blend compositions of this invention are those wherein the aliphatic diamine is hexamethylenediamine and the mole ratio of isophthalic acid/terephthalic acid moieties is about 100-55/0-45. These polyphthalamide components generally have inherent viscosities of about 0.75 to about 1.4 dl/g, with about 1.0 to about 1.1 dl/g being preferred from the standpoint of melt stability and ease of processing.

The polyphthalamide component of the polyamide compositions of this invention can be prepared from the appropriate acids and diamines in suitable proportions by any suitable means. One such preparation involves a salt preparation step, preferably conducted batchwise to achieve proper stoichiometry, wherein acids, diamines and solvent are added to a suitable reaction vessel in appropriate amounts and maintained under conditions effective to cause salt formation but avoid appreciable conversion of salts to oligomers. Water is a preferred solvent and temperature is preferably maintained below about 120° C. to minimize conversion. Product of the salt preparation step can be introduced into a condensation section operated either batchwise or in a continuous mode. In the condensation section substantial conversion of salts to polymer takes place. The condensation product then typically is introduced into a finishing section, such as a twinscrew extruder, to obtain further conversion and generally increase inherent viscosity from a level of about 0.1 to about 0.6 dl/g achieved in the condensation section up to about 0.8 dl/g or greater. The polymeric product can be recovered from the finishing section and, for example, pelletized or mixed with fillers, additives and the like. Commonly assigned U.S. Pat. Nos. 4,603,193 and 4,831,108 are also directed to preparation of such polyphthalamides.

An example of the aliphatic diamines which can be used to prepare the amorphous polyphthalamides is hexamethylenediamine. Minor amounts of 2,2,4-trimethylhexamethylenediamine and 2,4,4-trimethylhexamethylenediamine can also be present or can replace the hexamethylenediamine. Aromatic dicarboxylic acids which can be used to prepare the amorphous polyphthalamides are isophthalic acid, terephthalic acid, and alkyl substituted iso- and terephthalic acids and mixtures of these acids.

A preferred amorphous polyphthalamide has a molar ratio of isophthalic acid/terephthalic acid/hexamethylenediamine of about 50-27.5/0-22.5/50. These polyphthalamides tend to show little or no crystallinity with the tendency for crystallization decreasing with increasing isophthalic acid content.

It has been found that improved oxygen barrier properties and resistance to whitening in injection blow-molded vessels are obtained by extrusion melt blending of amorphous polyphthalamides obtained from the reaction product of about 50 to about 27.5 mol percent isophthalic acid, about 0 to about 22.5 mole percent terephthalic acid and about 50 mol percent hexamethylenediamine and MXDA resin obtained from the reaction product of about 50 to about 35 mol percent adipic acid, about 0 to about 15 mol percent isophthalic acid and about 50 mol percent metaxylylenediamine wherein the melt blend of amorphous polyphthalamide and MXDA resin comprises a maximum of 99 weight percent amorphous polyphthalamide, preferably from about 75 to about 25 weight percent amorphous polyphthalamide, most preferably from about 60 to about 40 weight percent of amorphous polyphthalamide based on the combined weight of MXDA resin and amorphous polyphthalamide. It has been found that miscible blends of MXDA resin with amorphous polyphthalamides at these levels improve the oxygen barrier properties, the resistance to whitening and hazing in less oriented portions of the vessel and the oxygen barrier properties as the relative humidity increases.

The miscible polymer blend method of preparing the polyamide compositions of this invention can be produced by mixing pellets of MXDA resin and pellets of amorphous polyphthalamide, heating the pellet mixture with minimum exposure to air at a temperature at which the pellet mixture has been thermally softened or melted, subjecting the mixture to a pressure in excess of 500 pounds per square inch and effecting turbulence and interkneading of the compounds with high shearing action to form the miscible blend. The moisture content of the MXDA resin and the amorphous polyphthalamide during processing should be about 50 to about 500 ppm and preferably about 100 to about 200 ppm of water. Conventional drying equipment can be used to obtain these moisture levels.

The polyamide compositions may optionally be combined with additives such as antistatic agents, lubricants, anti-blocking agents, stabilizers, dyestuffs, pigments and the like.

These polyamide compositions can be used in barrier packaging which require improved resistance to oxygen permeability. As used herein, the term "container" is intended to mean shaped articles suitable for use in packaging which incorporate the polyamide compositions of the instant invention. Such shaped articles include not only sheets and films which are extruded from the polyamide compositions and which may be used as such or as barrier layers, container liners, and as components of laminates and composites, but also articles which include extrusion or injection blow-molded containers, such as bottles, and films and containers which are thermoformed into bottles, jars, cans, bowls, trays, dishes and pouches.

Films containing the polyamide compositions of this invention can be manufactured by conventional processes such as melt processes using the T-die method or the inflation method, wet process or dry process. When unoriented film using the polyamide compositions is manufactured by the T-die method of the melt process, the polyamide composition may be dried to an appropriate moisture content by conventional drying equipment, incorporated with or without additive and heated to a temperature higher than the processing temperature of the polyamide composition and extruded through a T-die with the resulting film cooled by a roll or liquid bath. The unoriented film can be subsequently uniaxially or biaxially drawn to obtain an oriented film.

A particular utility for which the invented polyamide compositions are well suited is barrier packaging including films, laminates and molded articles in the form of vessels and containers. Containers which can be made using the polyamide compositions of the present invention have a monolayer structure comprising the invented polyamide composition of a multilayer structure comprising at least two layers of synthetic polymeric resins, at least one of which is the invented polyamide composition. The multilayer vessel preferably comprises an inner layer composed of a thermoplastic resin, at least one intermediate or middle layer composed of the polyamide composition and an outer layer composed of a thermoplastic resin or a synthetic resin having impermeability to moisture, said inner, intermediate and outer layers being oriented in at least one direction at the thin part of the vessel wall. Injection molded bottles comprising the invented polyamide compositions, including multilayer bottles comprising at least one layer of such compositions and at least one layer of another thermoplastic resin are disclosed in detail in commonly assigned application Ser. No. 383,186, now U.S. Pat. No. 5,028,462, for Molded Bottles and Method for Producing Same filed contemporaneously herewith.

Generally, the polyamide compositions of the present invention may be used to produce a monolayer or multilayer vessel by forming a vessel preform, i.e., a monolayer or multilayer parison and then orienting and blow-molding the parison. In order to obtain a desired vessel having excellent gas barrier properties and high transparency, the parison should also have good transparency and further the resin components at the thin parts of the vessel wall (mainly the body thereof) should be at least uniaxially oriented, and hence, the parison should be also at least uniaxially oriented to produce such a vessel.

As the thermoplastic resin which composes the inner and outer layers of the multilayer vessel, a conventional fiber-forming polyester resin or a polycarbonate resin can be used. Particularly, a polyester resin having repeating units consisting predominantly of ethylene terephthalate known as PET having an inherent viscosity between about 0.55 and 1.10 dl/g is preferable.

The thermoplastic polyester resin or polycarbonate resin used in making multiwall containers which employ the polyamide compositions of the present invention may optionally be combined with an appropriate amount of additives such as colorants, ultraviolet absorbers, antistatic agents, agents for preventing deterioration of properties due to heat and oxidation, antimicrobial agents, lubricants and the like.

In a multilayer vessel, the outer layer of synthetic resin having impermeability to moisture of the vessel can be formed as an outer layer of a multilayer parison or can be formed on the blend layer after orientation and blow molding of the parison as a finishing of the surface of the blend layer, coating the blend layer with a film, top-coating which is employed in certain kinds of glass and bottles, spray coating and the like. Preferably, the outer layer is formed on the multilayer parison and then the parison is oriented and blow-molded to produce the vessel.

In areas of multilayer or single layer vessels containing conventional poly(metaxylyleneadipamide) resin with little or no orientation, these areas have a tendency to whiten or become hazy in the presence of moisture. According to a product bulletin entitled "Toyobo Nylon MXD6" distributed by Toyobo Company relating to resins referred to as Nylon MXD6, "When non-oriented MXD6 absorbs water from the air, it becomes white. The water absorption lowers glass transition temperature and crystallized temperature, and then makes MXD6 crystallized at room temperature. If the transparency is required for long periods, non-oriented products are not suitable. As far as the multilayer products (PET/MXD6/PET) are concerned the outside layers prevent MXD6 from absorbing water, making crystallization much slower."

However, we have observed whitening in bottles containing MXD6 polymer after hot liquid filling tests, wet oxygen permeation tests, shelf life tests with water and after storage at ambient conditions. The time required for whitening to occur ranges from less than 24 hours under hot liquid fill conditions to about 6–8 months for bottles stored at room temperature and relative humidity. Tests were conducted with bottle sets containing core layers of the MXD6 polymer, and of polyamide blend compositions of this invention of Selar PA 3426 (an amorphous polyamide of DuPont) blended with MXD6 polymer and an amorphous polyphthalamide having a molar ratio of 30/20/50 for IA/TA/HMDA blended with MXD6 polymer. These tests showed that the whitening effect occurs within 48 hours in bottles containing only MXD6 polymer as a core layer and that essentially no change was observed in the bottles containing the invented polyamide compositions over an eight week test period.

The polyamide miscible blend of MXDA resin and amorphous polyphthalamide that forms one embodiment of the polyamide composition of the present invention used to produce the multilayer vessel has a higher Tg than that of the MXD6 polymer alone. Since the Tg of the polyamide composition is compatible with that of the polyester resin, the polyamide composition is sufficiently oriented under orientation conditions for the polyester resin. A vessel having high transparency as well as excellent gas barrier properties and heat stability and, therefore, having high commercial value can be obtained.

The following examples further illustrate the present invention, although it will be understood that these examples are for purposes of illustration and are not intended to limit the scope of the invention.

EXAMPLE 1

A polyamide copolymer was prepared from isophthalic acid, terephthalic acid and hexamethylenediamine in a mole ratio of about 30/20/50 as follows:

To a stainless steel, stirred reactor having a heating oil jacket, referred to hereinbelow as the salt reactor, were added quantities of hexamethylenediamine, water (representing 35% of the total mass charged), isophthalic acid and terephthalic acid. About 1.3 mol % benzoic acid, based on total moles of diamine and diacids, was added as an endcapping agent. Zinc hypophosphite catalyst at a level of 800 ppm was added to the reactor. Once the salt reactor had been charged, it was purged with nitrogen and heated to 218° C. The pressure in the salt reactor was increased to 480 psig by first allowing the water in the salt to reach its equilibrium pressure and then adjusting with nitrogen. The average residence time in the salt reactor was about 100 minutes.

Upon leaving the salt reactor, the reactor contents, comprising an aqueous salt solution were passed through a 140 micron filter into a dual-headed Bran-Lubbe piston pump. Temperature through the pump was maintained at 218° C. and the pressure was increased to 1800 psig in the pump. Following the pump, the salt solution was passed through a preheat zone and heated to a temperature of 316° C. The elevated pressure prevented vapor formation in the salt solution as it passed through the preheater. The salt solution had a residence time in the preheater of 40 seconds.

The salt solution was introduced into a flash reactor through a control valve manufactured by Research Control Valve (RCV) where the pressure was reduced from 1800 psig to 400 psig. Wall temperatures in the flash reactor were kept at 399° C. using electrical heaters with the solution temperature ranging from 274° C. to 324° C. depending on the location of the solution in the reactor. Pressure in the flash reactor was controlled by a second RCV.

After leaving the flash reactor, prepolymer formed from the salt solution had an inherent viscosity (I.V.) of 0.2–0.24 dl/g as measured in phenol/tetrachloroethane solvent at 30° C. The polymer was injected directly onto the screws of a twin-screw Model ZSK-30 extruder manufactured by the Werner & Pfleiderer Corporation. An open screw design was used to facilitate vapor removal. A screw speed of 200 rpm was used to maintain minimum fill on the screws. A temperature of 327° C. was maintained in the injection zone with a gradual decline in temperature to 316° C. at the extruder die head. Following the extruder, the polymer strand was passed through a water bath and pelletized. The product I.V. was 0.9 dl/g.

EXAMPLE 2

A polyamide copolymer was prepared from isophthalic acid, adipic acid and metaxylylenediamine in a mole ratio of about 25/75/103 as follows:

To a stainless steel, stirred reactor having a heating oil jacket were added quantities of metaxylylenediamine, water (representing 35% of the total mass charged), isophthalic acid and adipic acid. About 1.3 mol % benzoic acid, based on total moles of diamine and diacids, was added as an endcapping agent. The temperature of the reactor contents was increased during the addition of the diacids from ambient to 70° C. Zinc hypophosphite catalyst at a level of 800 ppm was added to the reactor, after which the reactor was sealed, purged repeatedly with nitrogen, blanketed with a 6.7 kg/cm nitrogen blanket and heated to about 121° C. and maintained at that temperature.

Contents of the reactor were pumped continuously to a jacketed, oil-heated, stirred tank and maintained under a pressure of 16.8 kg/cm therein using a microprocessor-controlled Research Control Valve. The temperature of the liquid phase was maintained at 216° C. Under these conditions, the water content of the solution was decreased in the feed tank from about 35% to about 15% by weight, neglecting water of reaction. The residence time in the tank was about 15 minutes.

The contents of the tank were pumped continuously to and through two jacketed, oil-heated, stainless steel pipes of 0.95 cm inside diameter and lengths of 274 and 401 cm in series, at a rate of about 8 kg/hr using a dual-headed Bran-Lubbe piston pump. The solution contents of the tank being pumped through the pipes was heated to approximately 160° C. by the exit of the first pipe and up to approximately 165° C. by the exit of the second pipe. The pressure inside both pipes was maintained at about 128 kg/cm.

The contents of the second heated pipe were passed continuously through a Research Control Valve to a jacketed tube having a 0.94 cm inside diameter and a 274 cm length equipped with thermocouples to monitor temperatures in the tube and the heating jacket. The pressure of the jacketed tube was maintained at 8.1 kg/cm and 340° C. heat exchange fluid was circulated in the heating jacket.

The contents of the jacketed tube, consisting of water vapor and molten polymer, were introduced continuously onto the twin screws of a Werner & Pfleiderer Corporation ZSK-30 extruder. Volatiles were allowed to escape through a rear vent in the extruder barrel. Polymer was conveyed between screw flights with the screws rotating at 100 rpm and the extruder barrel heated at 300°–316° C.

The polymer melt was then pumped by a gear pump mounted on the end of the extruder through a screen changer and through a strand die 0.24 cm in diameter. The temperature profile in the screen changer was lowered to about 260° C. to allow good strandability. The polymer strands were then passed through a water bath and chopped into pellets with the inherent viscosity of the resulting polyamide of about 0.60 dl/g as measured in a 60/40 phenol/tetrachloroethane solvent at 30° C.

EXAMPLE 3

Copolymers were prepared from adipic acid, isophthalic acid and metaxylylenediamine as follows:

To a jacketed 4CV (helicone reactor of Atlantic Research Corp.) was added, 37.1 parts by weight (pbw) of adipic acid (manufactured by Monsanto Co.), 14.1 pbw of isophthalic acid (IPA-99 manufactured by Amoco Chemical Co.), 1.3 pbw of benzoic acid (manufactured by Monsanto Co.) and 0.001 pbw of sodium hypophosphite catalyst (manufactured by Monsanto Co.) at room temperature. Wash water and water totalling an amount equivalent to 30 pbw was added to the reactor and the agitator was started. The reactor was flushed with nitrogen gas several times and the reactor heating system was started and the reactor was heated to a temperature of 51° C. After the reactor reached a temperature of 51° C., 47.4 pbw of metaxylylenediamine (manufactured by Mitsubishi Gas Chemicals Inc.) was slowly added at a constant rate to the reactor over a five hour period. Water, equivalent to 3.3 pbw, used to wash out the metaxylylenediamine addition equipment was added to the reactor. The reactor was heated and maintained at 135° C. for 30 minutes before nitrogen gas was introduced to the reactor. The reactor was heated to a temperature of 299° C. and held at 299° C. for approximately 45 minutes as water was being removed from the overhead of the reactor. The temperature was reduced slightly and the product was removed from the reactor by stranding the resin product through a water bath and chopper. The polymer reaction product was cooled overnight, ground to a particle size of 5 mm and dried overnight, under partial vacuum conditions, at a temperature of 80°–100° C. The polymer product had an inherent viscosity of 0.9 dl/g as measured in a 60/40 weight ratio of phenol/tetrachloroethane at 30° C. and a glass transition temperature of 100° C.

Oxygen barrier properties were obtained from thin films obtained from intermediate layers of multilayer bottles prepared by coinjection molding of parisons having a layer of the polyamide prepared in this Example 3 between layers of PET using an ASB 250TH machine manufactured by Nissei ASB and determining the oxygen transmission rates on a Modern Control Company Ox-Tran 1000 instrument. A value of 0.55 cc-mil/100 in$^2$-day-atm was obtained for the oxygen transmission rate measured at 23° C., 0% relative humidity and 100% oxygen. Under humid conditions of greater than 80% relative humidity, a value of 0.25 cc-mil/100 in$^2$-day-atm was obtained.

Similar polymer preparation runs and runs at other IA/AA molar ratio compositions with metaxylylenediamine were prepared and films were formed essentially by the procedures given above. The measured I.V.s, Tgs and oxygen transmission rates for these polyamides and films are tabulated in Table 1 below.

TABLE 1

Metaxylylenediamine-containing Polyamides

| Acid Composition, mol % | | I.V. | Tg | Oxygen Transmission Rate |
|---|---|---|---|---|
| Adipic | Isophthalic | dl/g | °C. | cc-mil/100 in$^2$-day-atm |
| 75 | 25 | 0.93 | 99 | 0.60 |
| 85 | 15 | 0.92 | 92 | 0.44 |
| 93 | 7 | 2.32 | 85 | 0.20 |

EXAMPLE 4

A polyamide copolymer was prepared from adipic acid, isophthalic acid, terephthalic acid, metaxylylenediamine and hexamethylenediamine in a mole ratio of about 25/15/10/25/25 as follows:

To a laboratory resin kettle equipped with an agitator and vacuum condenser was added, 25.7 pbw of adipic acid, 17.6 pbw of isophthalic acid, 11.7 pbw of terephthalic acid and 0.001 pbw of sodium hypophosphite catalyst at room temperature. An amount of water equivalent to 35.2 pbw of the reactants was added to the reactor and the stirrer was started and operated at 200 rpm. The reactor was flushed several times with nitrogen and the heating system was started and the reactor heated to 64° C. After the reactor reached a temperature of 64° C., 24.2 pbw of metaxylylenediamine and 20.7 pbw of hexamethylenediamine were slowly added over a 17 minute period. A small amount of water was used to flush the residual diamines from the addition funnel and this water was added to the reactor. The reactor was heated to 290°-300° C. and a nitrogen purge was introduced to the reactor to strip the water overhead. The water was removed over a period of 1 and ½ hours and the reactor contents became a clear melt. The reactor contents were heated at 290°-300° C. for an additional 1 and ½ hours. The stirrer and heating were shut off and the polymer was removed from the resin kettle while still hot and placed on aluminum foil to cool overnight. The polymer was ground to a particle size of 5 mm, dried overnight under partial vacuum conditions, at a temperature of 80°-100° C. The polymer product had an inherent viscosity of 0.79 dl/g measured in a 60/40 weight ratio of phenol/tetrachloroethane solvent at 30° C. and a Tg of 100° C. The polymer product was used to prepare a compression molded film on a Pasadena Hydraulics, Inc., Model S100R-2376 100-ton press. One-half inch hardened steel ground to a 1-mil tolerance in thickness was used for platens to press out thin films. The films were measured for oxygen transmission rate with a value of 1.61 cc-mil/100 in$^2$-day-atm obtained, measured at 23° C. and 100% oxygen with a Modern Control Company Ox-Tran 1000 instrument.

EXAMPLE 5

Films were prepared and oxygen transmission rates determined on these films for a MXDA resin, an amorphous polyphthalamide, the copolymer of Example 4 and blends of MXDA resin/amorphous polyphthalamide as follows:

Films of a MXDA resin, the amorphous polyphthalamide (APA) of Example 1, the copolymer of Example 4 and blends of MXDA resin/APA having dimensions of 4 inch by 4 inch were prepared by extrusion. The APA and blends using APA used the APA of Example 1 which had a molar ratio of 30/20/50 for IA/TA/HMDA. The MXDA resin and blends using MXDA resin used a T-600 MXD6 resin of the Toyobo Company having a molar ratio of 50/50 for AA/MXDA. The copolymer of Example 4 had a molar ratio of 25/15/10/25/25 for AA/IA/TA/MXDA/HMDA, corresponding to a 50/50 weight ratio blend of APA/MXDA resin with APA having a molar ratio of 30/20/50 for IA/TA/HMDA and MXDA resin having a molar ratio of 50/50 for AA/MXDA. The blends of MXDA resin and APA were prepared by adding weighed amounts of MXDA resin and APA into a ¾" Brabender extruder which had a screw typically used for processing nylon resins. The oxygen transmission rates of these unoriented films were determined on a Modern Control Company Ox-Tran 1000 at a temperature of 23° C., 100 percent oxygen and 0 percent relative humidity and are given in Table 2 below together with Tgs.

For purposes of comparison, oxygen transmission rates of films prepared in like manner from the APA and MXDA resin components of the blends were also determined. Table 2 also presents calculated oxygen transmission rates determined by adding the product of the weight fraction of APA for a given blend and the measured oxygen transmission rate for APA film to the product of the weight fraction of MXDA resin for the blend and the measured oxygen transmission rate for MXDA resin film.

TABLE 2

Measured and Calculated Oxygen Transmission Rates

| Composition (weight ratio) | Tg °C. | Oxygen-Transmission Rate (cc-mil/100 in$^2$-day-atm) | |
|---|---|---|---|
| | | Measured | Calculated |
| MXDA Resin | 80 | 0.55 | — |
| APA/MXDA Blend (25/75) | 91 | 0.85 | 1.46 |
| APA/MXDA Blend (50/50) | 102 | 1.5 | 2.38 |
| Copolymer | 100 | 1.6 | — |
| APA/MXDA Blend (75/25) | 112 | 2.3 | 3.29 |
| APA | 123 | 4.2 | — |

As can be seen from Table 2, measured oxygen transmission rates for the blend and copolymer compositions of the invention were significantly lower than the values calculated indicating that this property does not follow the rule of mixtures for the invented polyamide blend compositions.

EXAMPLE 6

Films were prepared and oxygen transmission rates determined on these films for blends of MXDA resin/amorphous polyphthalamide as follows:

Films of MXDA resin, blends of MXDA resin/amorphous polyphthalamide and amorphous polyphthalamide were prepared by extrusion with the blends formed by the procedure given in Example 5. The MXDA resin was T-600 MXD6 resin of the Toyobo Company. The amorphous polyphthalamine was Selar PA 3426, an amorphous polyamide manufactured by E. I. DuPont de Nemours and Company, having a molar ratio of about 35/15/50 for IA/TA/HMDA. Blends of MXDA resin and APA were prepared by adding weighed amounts of MXDA resin and APA into a ¾" Brabender extruder which had a screw typically used for processing nylon resins. The oxygen transmission rates of these unoriented films were determined on a Modern Control Company Ox-Tran 1000 at a temperature of 23° C., 100 percent oxygen and 0 percent relative humidity and are given in Table 3 below together with Tgs.

For purposes of comparison, oxygen transmission rates of films prepared in like manner from the Selar PA and MXDA resin components of the blends were also determined. Table 3 also presents calculated oxygen transmission rates determined by adding the product of the weight fraction of Selar PA for a given blend and the measured oxygen transmission rate for Selar PA film to the product of the weight fraction of MXDA resin for the blend and the measured oxygen transmission rate for MXDA resin film.

TABLE 3

| Measured and Calculated Oxygen Transmission Rates | | | |
|---|---|---|---|
| Composition (weight ratio) | Tg °C. | Oxygen Transmission Rate (cc-mil/100 in²-day-atm) | |
| | | Measured | Calculated |
| MXDA Resin | 80 | 0.55 | — |
| Selar PA/MXDA Blend (25/75) | 90 | 0.96 | 1.36 |
| Selar PA/MXDA Blend (50/50) | 100 | 1.5 | 2.18 |
| Selar PA/MXDA Blend (75/25) | 100 | 2.3 | 2.99 |
| Selar PA | 120 | 3.8 | — |

As can be seen from Table 3, measured oxygen transmission rates for the blend and copolymer compositions of the invention were significantly lower than the values calculated indicating that this property does not follow the rule of mixtures for the invented polyamide blend compositions.

EXAMPLE 7

Films of an MXDA resin, blends of an MXDA resin/amorphous polyphthalamide and an amorphous polyphthalamide were prepared by extrusion with the blends prepared by the procedure given in Example 5. The MXDA resin was T-600 MXD6 resin of the Toyobo Company. The amorphous polyphthalamide was Nydur T40, manufactured by Bayer, having a molar ratio of isophthalic acid/hexamethylenediamine of 50/50. The blends of MXDA resin and Nydur T40 were prepared by adding weighed amounts of MXDA resin and Nydur T40 into a ¾" Brabender extruder which had a screw typically used for processing nylon resins. The oxygen transmission rates of these unoriented films were determined on a Modern Control Company Ox-Tran 1000 at a temperature of 23° C., 100 percent oxygen and 0 percent relative humidity and are given in Table 4 below, together with Tgs. Calculated oxygen transmission rates for the blends were determined by adding the product of the weight fraction of Nydur T40 for a given blend and the measured oxygen transmission rate for Nydur T40 film to the product of the weight fraction of MXDA resin of the blend and the measured oxygen transmission rate for MXDA resin film.

TABLE 4

| Measured and Calculated Oxygen Transmission Rates | | | |
|---|---|---|---|
| Composition (weight ratio) | Tg °C. | Oxygen Transmission Rate (cc-mil/100 in²-day-atm) | |
| | | Measured | Calculated |
| MXDA Resin | 80 | 0.60 | — |
| Nydur T40/MXDA Blend (25/75) | 91 | 0.89 | 1.18 |
| Nydur T40/MXDA Blend (50/50) | 101 | 1.23 | 1.77 |
| Nydur T40/MXDA Blend (75/25) | 112 | 1.86 | 2.35 |
| Nydur T40 | 122 | 2.93 | — |

As with the blends of Example 5, containing an APA component having a molar ratio of 30/20/50 for IA/TA/HMDA, the blends of this example with a molar ratio of 50/50 for IA/HMDA for the APA had better oxygen transmission rates than the calculated values.

EXAMPLE 8

Films of Trogamid T, an amorphous polyamide of terephthalic acid and trimethylhexamethylenediamine; nylon 610, a semicrystalline aliphatic polyamide; a 50/50 weight/weight blend of Trogamid T/nylon 610 and a 50/50 weight/weight blend of Trogamid T/MXD6 were prepared by extrusion and oxygen transmission rates of these unoriented films were determined on a Modern Control Company Ox-Tran 1000 instrument at 23° C., 100 percent oxygen and 0 percent relative humidity. Trogamid T was manufactured by Huls America, Inc. Nylon 610 was manufactured by BASF, Inc., and MXD6 was manufactured by Toyobo Company. The measured oxygen transmission rates are given in Table 5 below, together with Tgs for composition in which Tgs were determined.

TABLE 5

| Measured Oxygen Transmission Rates | | |
|---|---|---|
| Composition (weight ratio) | Tg °C. | Oxygen Transmission Rate (cc-mil/100 in²-day-atm) Calculated |
| nylon 610 | — | 17.2 |
| Trogamid T/nylon 610 (50/50) | — | 19.2 |
| Trogamid T | 152 | 10.9 |
| Trogamid T/MXD6 (50/50) | 138 | 2.7 |

As can be seen from the tabulated oxygen transmission rates in Table 5, not all blends of amorphous polyamides and semicrystalline polyamides give oxygen transmission rates which are better than the calculated values from the rules of mixtures. For the materials used in Example 8 as a comparative example, Trogamid T and nylon 610, the blend oxygen transmission rate is higher than either of the blend components whereas a blend of Trogamid T/MXD6 which is representative of the polyamide compositions of the present invention shows the unexpected improvement in oxygen transmission rate.

EXAMPLES 9-11

Example 9 is a control example in which a monolayer vessel in the form of a 12 fluid ounce round container was blow-molded on an ASB 250TH machine manufactured by Nissei ASB using Goodyear 7207 PET resin.

Example 10 was a multilayer vessel prepared in the form of 12 fluid ounce round containers and blow-molded on an ASB 250TH machine manufactured by Nissei ASB with PET resin for the outer and inner layers and a blend of MXDA resin and an amorphous polyphthalamide in a weight ratio of 50/50 for the middle layer. The MXDA resin was T-600 MXD6 resin of the Toyobo Company. The amorphous polyphthalamide was the copolymer of Example 1 having a molar ratio of 30/20/50 for isophthalic acid/terephthalic acid/hexamethylenediamine. The PET resin was Goodyear 7207.

Example 11 was a multilayer vessel prepared in the form of 12 fluid ounce round containers and blow-molded on an ASB 250TH machine manufactured by Nissei ASB with PET resin for the outer and inner layers and a blend of MXDA resin and an amorphous polyphthalamide in a weight ratio of 50/50 for the middle layer. The MXDA resin was T-600 MXD6 resin of the Toyobo Company. The amorphous polyphthalamide was an amorphous polyamide of Dupont, Selar PA 3426, an isophthalic acid/terephthalic acid/hexamethylenediamine copolymer in a molar ratio of 35/15/50. The PET resin was Goodyear 7207. Physical and oxygen transmission properties determined for the bottles are tabulated in Table 6 below.

TABLE 6

Bottle Physical and Oxygen Transmission Properties

| | Example | | |
|---|---|---|---|
| | 9 | 10 | 11 |
| Weight, gm | 30.8 | 30.6 | 30.7 |
| Thickness, mil | | | |
| Average wall | 18.6 | 17.4 | 17.6 |
| Middle Layer | 0 | 2.2 | 1.5 |
| Oxygen Transmission cc/pkg/day | 0.027 | 0.009 | 0.0085 |

As is clear from the results of Table 6, the bottles of Examples 10 and 11 have remarkably improved oxygen transmission properties in comparison with Example 9, a bottle with PET alone.

EXAMPLES 12-14

Vessels in the form of 12 fluid ounce round containers were blow-molded on an ASB 250TH machine manufactured by Nissei ASB.

Example 12 is a control example in which Example 9 was repeated to prepare monolayer vessels in the form of 12 fluid ounce round containers blow-molded on an ASB 250TH machine manufactured by Nissei ASB with Goodyear 7207 PET resin.

Example 13 also is a control example in which multilayer vessels prepared in the form of 12 fluid ounce round containers were blow-molded on an ASB 250TH machine manufactured by Nissei ASB with PET resin for the outer and inner layers and MXDA resin for the intermediate layer. The MXDA resin was T-600 MXD6 resin of the Toyobo Company. The PET resin was Goodyear 7207.

Example 14 was multilayer vessels prepared in the form of 12 fluid ounce round containers blow-molded on an ASB 250TH machine manufactured by Nissei ASB with PET resin for the outer and inner layers and a blend composition according to this invention of MXDA resin and an amorphous polyphthalamide in a weight ratio of 50/50 for the middle layer. The MXDA resin was T-600 MXD6 resin of the Toyobo Company. The amorphous polyamide was Selar PA 3426. The PET resin was Goodyear 7207 grade as used in Example 9. Physical and oxygen transmission properties determined for the bottles are tabulated in Table 7.

TABLE 7

Bottle Physical and Oxygen Transmission Properties

| | Example | | |
|---|---|---|---|
| | 9 | 10 | 11 |
| Weight, gm | 30.7 | 30.5 | 30.4 |
| Thickness, mil | | | |
| Average wall | 20.6 | 17.9 | 18.2 |
| Middle Layer | 0 | 1.6 | 1.2 |
| Oxygen Transmission cc/pkg/day | 0.024 | 0.009 | 0.017 |

As is clear from the results presented in Table 7, the bottles of Example 14 have improved oxygen transmission properties compared to Example 12 and are intermediate between Example 12 and Example 13, which has a thicker middle layer of the MXD6 polymer.

EXAMPLE 15

Multilayer containers in the form of 10 ounce round bottles were blow-molded on an ASB 250TH machine manufactured by Nissei ASB. The inner and outer layers were PET and the intermediate layer was T-600 MXD6 resin of the Toyobo Company and an amorphous polyamide Selar PA 3426 blended in a weight ratio of 50/50. Several of these bottles and bottles made with a middle layer of only MXD6 resin were filled with water, capped and placed in an oven maintained at a temperature of 38° C. and a relative humidity of 90%. After 48 hours of storage in the oven at 38° C., loss of clarity in the bottles that had MXD6 in the middle layer was observed in the form of a severe haze or "whitening" effect in the bottle walls. The bottles which contained the blend of MXD6 and Selar PA 3246 were unaffected and remained clear.

COMPARATIVE EXAMPLE

Multilayer containers in the form of 8 ounce oval bottles were blow-molded on an ASB 250TH machine manufactured by Nissei ASB. The inner and outer layers were PET and the middle layer was T-600 MXD6 resin of the Toyobo Company. Seven of these bottles with the middle layer varying in thickness between 5 and 14 percent of the total bottle wall thickness were filled with water, capped and placed in an oven maintained at a temperature of 38° C. After 48 hours of storage in the oven at 38° C., loss of clarity in the bottles was observed in the form of haze or "whitening" effect in the bottle walls. The severity of the haze corresponded to the thickness of the middle layer with a slight haze at the 5% middle wall thickness to a severe haze at the 14% middle wall thickness.

We claim:

1. A polyamide composition having improved gas barrier properties comprising the following recurring units:

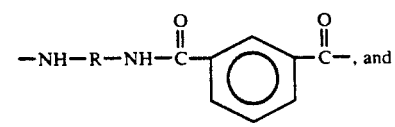

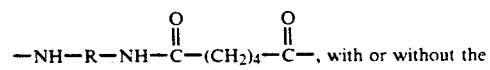

, with or without the with or without the following recurring unit:

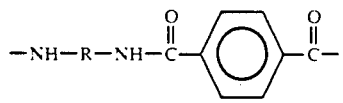

such that the molar ratio of the dicarboxylic acid moieties in the A and C units is about 37.5-5/12.5-37.5 and in the B units is about 15 or less and wherein R is a divalent radical comprising

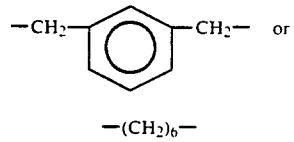

$-(CH_2)_6-$     E provided that said D and E radicals are present in the A, B and C units in a molar ratio of about 37.5-12.5/12.5-37.5 and wherein said polyamide composition has a glass transition temperature of 90° C. or greater and an oxygen transmission rate of about 2.0 cc-mil/100 in$^2$-day-atm or less.

2. The polyamide composition of claim 1 comprising a copolymer of reactants selected from the group consisting of isophthalic acid, terephthalic acid, adipic acid, metaxylylenediamine and hexamethylenediamine wherein the molar ratio of isophthalic acid/terephthalic acid/adipic acid/metaxylylenediamine/hexamethylenediamine is about 37.5-5/0-15/12.5-37.5/37.5-12.5/12.5-37.5.

3. The polyamide composition of claim 2 wherein said molar ratio of isophthalic acid/terephthalic acid/adipic acid/metaxylylenediamine/hexamethylenediamine is about 30-5/0-15/20-30/30-20/20-30.

4. A film comprising the polyamide composition of claim 1.

5. A laminate comprising the polyamide composition of claim 1.

6. A molded article comprising the polyamide composition of claim 1.

7. A film comprising the polyamide composition of claim 2.

8. A laminate comprising the polyamide composition of claim 2.

9. A molded article comprising the polyamide composition of claim 2.

10. A film comprising the polyamide composition of claim 3.

11. A laminate comprising the polyamide composition of claim 3.

12. A molded article comprising the polyamide composition of claim 3.

* * * * *